3,702,330
IMIDAZOLYL ACRYLIC ACID DERIVATIVES
Dale R. Hoff, Basking Ridge, N.J., and Clarence S. Rooney, Beaconsfield, Quebec, Canada, assignors to Merck & Co. Inc., Rahway, N.J.
No Drawing. Filed Oct. 5, 1970, Ser. No. 78,298
Int. Cl. C07d 49/36
U.S. Cl. 260—309      5 Claims

ABSTRACT OF THE DISCLOSURE 5-nitroimidazolyl-2-acrylic acid and derivatives thereof are disclosed as well as processes for their preparation from 5-nitroimidazolyl-2-carboxaldehyde and malonic acid. Said 5-nitroimidazolyl acrylic acid derivatives are active as antiprotozol agents and compositions which are useful for the treatment of protozoal diseases containing said agents are also disclosed.

SUMMARY OF THE INVENTION

This invention relates to 5-nitroimidazolyl acrylic acid deriavtives and processes for their preparation. Said derivatives have high potency against a broad spectrum of bacteria and protozoa.

The compounds of this invention are best illustrated by the following structural formula:

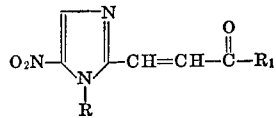

wherein R is loweralkyl or hydroxyloweralkyl; and $R_1$ is hydroxyl, loweralkoxy, halo, $-NR_3R_4$, wherein each of $R_3$ and $R_4$ are hydrogenloweralkyl, cyclohexylphenyl, halophenyl, or monocyclic heterocyclic of 5 or 6 members containing from 1 to 3 heteroatoms selected from the group consisting of oxygen, nitrogen and sulfur; also $R_3$ and $R_4$ can be taken together to represent a heterocyclic amine of 5 or 6 members optionally containing 1 or 2 other heteroatoms selected from the group consisting of oxygen, nitrogen, and sulfur.

When in the instant application reference is made to "lower" alkyl or "lower" alkoxy, what is meant is that the carbon chain contains from 1 to 5 carbon atoms which may be in either a straight or a branched configuration. Exemplary groups are: methyl, ethyl, propyl, butyl, amyl, methoxy, ethoxy, propoxy, butoxy, amyloxy and branched analogues thereof. When the 1-position of the imidazole nucleus is substituted with a hydroxyloweralkyl group, the hydroxyl group may be at any position of the loweralkyl group when said group contains more than one position for substitution. The term "halogen" refers to any of the four halogen atoms, fluorine, chlorine, bromine or iodine, however, in general, either chlorine or bromide is to be preferred.

PREFERRED EMBODIMENTS OF THE INVENTION

The preferred embodiments of the compounds of this invention are realized when R is loweralkyl or 2-hydroxyethyl and $R_1$ is amino or substituted amino. The substitutions preferred for the amino group are methyl, ethyl, phenyl, p-fluorophenyl, and heterocycles selected from thiazolyl, thienyl and oxazolyl. When the heterocyclic group has as one of its heteroatoms the nitrogen atom of the acrylamide group, the following groups are preferred; pyrrolidino, piperidino, morpholino, 4-methylpiperazino, and the like.

The compounds of the invention where R is methyl or 2-hydroxyethyl and $R_1$ is amino, monoloweralkylamino or diloweralkylamino, are especially preferred embodiments of the instant invention. The especially preferred embodiments of this invention are exemplified by the following list of compounds which, however, should not be construed as being exhaustive:

3-(1-methyl-5-nitro-2-imidazolyl)acrylamide
N-methyl-3-(1-methyl-5-nitro-2-imidazolyl)acrylamide
N,N-dimethyl-3-(1-methyl-5-nitro-2-imidazolyl)acrylamide
N,N-dimethyl-3-[1-(2-hydroxyethyl)-5-nitro-2-imidazolyl]acrylamide
N,N-diethyl-3-[1-(2-hydroxyethyl)-5-nitro-2-imidazolyl]acrylamide The compounds of this invention are prepared by a process which is illustrated by the following flow chart:

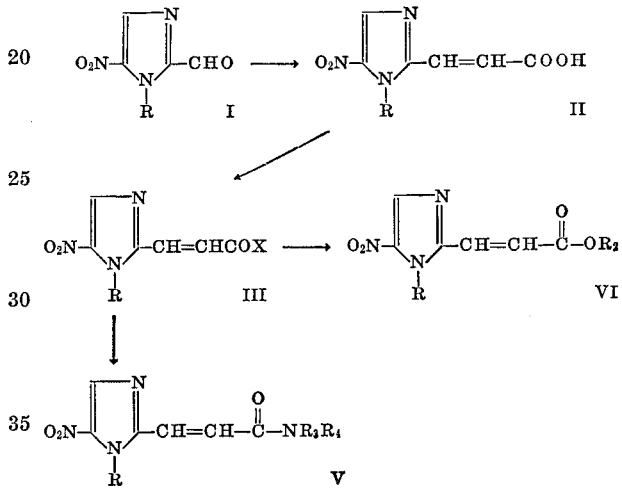

wherein R is as defined previously; X is a halogen; $R_2$ is loweralkyl; $R_3$ and $R_4$ are the same or different and are hydrogen, loweralkyl, cyclohexyl, phenyl, halophenyl, or heterocyclic of 5 or 6 members containing from 1 to 3 heteroatoms selected from the group consisting of oxygen, nitrogen and sulfur; $R_3$ and $R_4$ can also be taken together to represent a heterocyclic amino of 5 or 6 members optionally containing 1 or 2 other heteroatoms selected from the group consisting of oxygen, nitrogen and sulfur.

The process utilizes a 1-substituted-5-nitro-imidazole-2-aldehyde (I) as starting material, the preparation of which is well known to those skilled in the art and from which are prepared the arcylic acid derivatives. The acrylic acid derivative (II) is prepared by combining the aldehyde and malonic acid in the presence of a basic catalyst such as pyridine, at a temperature of from 50° to 100° C. for a duration of from 10 minutes to 5 hours. The reaction is generally complete in from ½ to 2 hours at 100° C. The product is isolated by neutralization of the basic catalyst with an inorganic acid, preferably a mineral acid, followed by standard laboratory techniques known to those skilled in the art.

From the acrylic acid derivative (II) one can prepare the acryloyl halide derivative (III). The reaction is run either with or without an inert solvent such as benzene, toluene and the like, however, a preferred embodiment of this process utilizes an excess of the halogenating agent such that no solvent is necessary. The halogenating agents useful for preparing the acryloyl halide compounds are those normally used for preparing acid halides: thionyl chloride, phosphorous oxychloride, oxalyl chloride, oxalyl bromide, and the like. The reagent of preference has been found to be oxalyl chloride. The reaction is generally run by heating the acid dissolved in the acid halide, using caution at first such that the reaction does not become too exothermic. The progress of the reaction is monitored by observing the extent of liberation of the hydrogen halide gas. When the acid gas is no longer being liberated from the reaction, the reaction is essentially complete. This has been observed to occur at from 10 minutes to 2 hours after the reflux commences. The product is isolated by removing in vacuo the solvent and/or excess halogenating agent. Because of the reactivity of the acryloyl halide derivatives it is not preferred to isolate them but rather to use them directly in subsequent reaction steps. When the 1-position of the imidazole nucleus is substituted with a substituent which is itself capable of reacting with the halogenating agent, such as hydroxyl, it should be protected prior to the reaction. The protecting groups of choice, due to their stability combined with relative ease of removal, are loweralkanoyl derivatives. They are most readily prepared by the use of an anhydride and are removed by acid or base catalyzed hydrolysis. The protecting groups are added prior to any other synthetic reaction and removed when all of the synthetic reactions are completed. This assures that there will be no competing reactions which will tend to reduce yields and produce impure products.

The acryloyl halide derivative (III) can be reacted either with an alcohol to produce an acrylate ester or ammonia or an amine to produce an acrylamide derivative.

Any alcohol may be reacted with the acryloyl halide, however, in general loweralcohols are preferred in which case said alcohol is used as the solvent for the reaction by being used in a much greater molar excess than the acryloyl halide. The reaction is run in the presence of a base which will react with and remove the hydrogen halide liberated during the course of the reaction. In general, tertiary organic amines are preferred being non-reactive with both starting materials and the product. Triethylamine and pyridine are exemplary. The reaction is run at about room temperature or slightly above for a duration of from 1 to 24 hours. Most reactions require from 8 to 18 hours at 25° C.

The acryloyl halide can also be reacted with any amine with one or more replaceable protons. There may be employed ammonia or any primary or secondary amine. The amine may be monosubstituted, disubstituted, or an integral part of nitrogen heterocycle, so long as there is a replaceable proton on the nitrogen. The various substituents on the nitrogen are as described previously.

The reaction proceeds in solution in a dry, inert solvent using at least two moles of the amine for each mole of the acryloyl halide. The excess amine reacts with the hydrogen halide liberated during the reaction. Instead of using an excess of the reacting amine, there may be employed one mole of said reacting amine and one mole of a non-reactive amine or other base such as pyridine or triethylamine. The reaction is run in a solvent inert to reaction with the starting materials, such as dioxane, benzene, toluene and the like. The solvents, prior to the reaction should be dried owing to the tendency of the acryloyl halide to react with water. The reaction is cooled initially due to initial exothermicity and, when the initial reaction subsides, stirred at a temperature of from 10° to 50° C. for a duration of from 5 minutes to 2 hours. The product is isolated by techniques known to those skilled in the art.

The new and novel imidazolyl acrylic acid derivatives of this invention are useful in the control of certain diseases. They are active against the protozoal diseases trichomoniasis, enterohepatitis and amoebiasis, and also against certain bacteria such as *Streptococcus pyogenes* and Salmonella.

Said imidazolyl acrylic acid derivatives are administered in combination with an acceptable non-toxic carrier therefor. It is often advantageous to combine the compounds of this invention with other antiprotozoal compounds such as coccidiostats, anthelmintics or antibacterial agents, or to combine more than one compound described herein in a single composition. Such combinations often provide for a synergistically active composition more beneficial than either compound alone.

Enterohepatitis, also known as histomoniasis and turkey blackhead disease, is caused by the protozoan parasite *Histomonas meleagridis* and its occurrence is a serious problem in the turkey raising industry. The compounds of this invention are effective in the prevention and treatment of enterohepatitis and when used for this purpose are administered to turkeys susceptible to the diasease mixed with an element of turkey sustenance i.e. the feed or drinking water of the birds. The optimum dose level will vary with the particular compound used, the severity of the infection, and the age of the birds to be treated. With the preferred compounds of the invention, good control of the infection is obtained by adding the drug to the feed at levels of about 0.007% to about 0.075% by weight. Somewhat higher levels may be used when the drug is administered via the drinking water.

The imidazolyl acrylic acid derivatives of this invention are also useful against trichomoniasis, a protozoan disease caused by species of the genus Trichomonas. A particularly troublesome form of trichomoniasis against which our compounds are active is caused by infestation of the vagina are *T. vaginalis* and is known as *T. vaginolis vaginitis*. Our novel compounds may be used orally or topically as antitrichomonal agents for oral administration. They are normally compounded in a pharmaceutical unit dosage form such as a tablet or capsule. Such unit dosage forms containing from about 50 to 500 mg. of active antitrichomonal ingredient are quite satisfactory and are prepared by techniques known to those skilled in the pharmaceutical art. Thus, these unit dosage forms will contain the normal excipients, lubricating agents and extenders regularly employed in compounding such forms. When used as oral antitrichomonal agents, it is generally preferred to administer imidazolyl acrylic acid derivatives at daily dose levels of about 50 to 750 mg., either in a single dosage or in a multiple divided dose administered over a daily period.

Alternatively, the drugs may be suspended or dissolved in liquid vehicles designed for oral administration. The final preparation may be in the form of a solution, emulsion, suspension, syrup, or the like and may be adapted for ultimate use by known methods with excipients, diluents, wetting agents or other additives. For topical administration topical jellies, creams, ointments or suppositories are normally employed.

The imidazolyl acrylic acid derivatives described herein also demonstrate activity against bacteria and especially against species of salmonella and streptococci as *Streptococcus pyogenes*.

The following examples are given for purposes of illustration of the invention and are not to be construed as limitations thereof.

EXAMPLE 1

3-(1-methyl-5-nitro-2-imidazolyl)-acrylic acid

1 - methyl - 5 - nitroimidazole - 2 - carboxaldehyde (15.5 g.; 0.1 mole) and malonic acid (10.9 g., 0.1 mole) are combined with 5 ml. of pyridine and the mixture is heated at steam-bath temperature for 30 minutes. Water (100 ml.) is added, followed, after cooling, by 25 ml. of 2.2 N hydrogen chloride. After an hour's digestion the solid crystalline product is collected by filtration, washed with water, and air-dried. The yield of crude product is 7.3 g. (37%). Recrystallization from 50% aqueous ethanol affords 3.4 g. of 3-(1 - methyl - 5 - nitro-2 - imidazolyl) acrylic acid, melting from 235–238° C. with decomposition.

EXAMPLE 2

3-(1-methyl-5-nitro-2-imidazolyl)acryloyl chloride

3 - (1 - methyl - 5 - nitro - 2 - imidazolyl)acrylic acid (3.5 g.) is treated for 30 minutes with 40 ml. of oxalyl chloride under reflux. The excess oxalyl chloride is then removed in vacuo to afford a residue of 3-(1-methyl-5-nitro - 2 - imidazolyl)acryloyl chloride, which is used is subsequent processes without purification.

EXAMPLE 3

3-(1-methyl-5-nitro-2-imidazolyl)acrylamide

The acid chloride prepared in Example 2 from 3.5 g. of free acid is dissolved in 300 ml. of dry benzene and the solution is filtered to remove a small amount of insoluble impurities. Dry gaseous ammonia is slowly bubbled through the solution for 30 minutes. The solvent is then removed by distillation to afford a residue of 3 - (1 - methyl - 5 - nitro - 2 - imidazolyl)acrylamide (3.1 g., 89%) which is purified by recrystallization from 50% aqueous ethanol. The pure product (2.3 g.) melts at 279 to 280° C. (dec.).

EXAMPLE 4

Ethyl-3-(2-methyl-5-nitro-2-imidazolyl)acrylate

1 - methyl - 5 - nitroimidazol - 2 - acryloyl chloride (2.16 g.; .01 mole) is dissolved in 20 cc. of dry ethanol containing 1.2 cc. of pyridine. The mixture is allowed to stand at room temperature, and then 150 ml. of water is added. The resulting solid is removed by filtration, washed with water, and dried. It is recrystallized from ethyl acetate/ether to afford pure ethyl-3-(1-methyl-5-nitro-2-imidazolyl)acrylate.

EXAMPLE 5

N-(isopropyl)-3-(1-methyl-5-nitro-2-imidazolyl)acrylamide

1 - methyl - 5 - nitroimidazole - 2 - acryloyl chloride (2.16 g.; 0.01 mole) is dissolved in 10 cc. of dry dioxane and the solution is added dropwise, with ice-bath cooling and stirring, to a solution of isopropylamine (1.18 g.; .02 mole) in 10 cc. of the same solvent. The addition requires 30 minutes. After an additional 30 minutes stirring, the reaction product is precipitated by the addition of 150 ml. of water. The solid is filtered, washed with water, and recrystallized from methanol to give substantially pure N-(isopropyl) - 3 - (1-methyl - 5 - nitro-2-imidazolyl)acrylamine.

When in the above procedure cyclohexylamine or 2-butylamine is employed in place of isopropylamine there is obtained N-cyclohexyl - 3 - (1 - methyl - 5 - nitro-2-imidazolyl)acrylamide, and N - (2 - butyl) - 3 - (1-methyl-5-nitro-2-imidazolyl)acrylamide, respectively.

EXAMPLE 6

N-phenyl-3-(1-methyl-5-nitro-2-imadazolyl)acrylamide

Following the procedure of Example 5 and using 2.16 g. (0.01 m.) of 1-methyl-5-nitroimidazol-2-acryloyl chloride, 10 cc. of dry dioxane, 1.6 g. (0.02 m.) of aniline in 10 cc. of dry dioxane, there is afforded N-phenyl-3-(1-methyl-5-nitro-2-imiadazolyl)acrylamide.

When in the above procedure N-methyl aniline, p-fluoroaniline, or 2-aminothiazole is employed in place of aniline there is obtained N-methyl-N-phenyl-3-(1-methyl - 5 - nitro-2-imidazolyl)acrylamide, N-(p-fluorophenyl)-3-(1-methyl-5-nitro-2-imidazolyl)acrylamide and N-(2 - thiazolyl)-3-(1-methyl-5-nitro-2-imadazolyl)acrylamide, respectively.

EXAMPLE 7

1-[3-(1-methyl-5-nitro-2-imidazolyl)acryloyl]pyrrolidine

Following the procedure of Example 5 and using 2.16 g. (0.01 m.) of 1-methyl-5-nitroimidazol-2-acryloyl chloride, 10 cc. of dry dioxane and 1.34 g. (0.02 m.) of pyrrolidine dissolved in 10 ml. of dry dioxane there is afforded 1-[3-(1-methyl - 5 - nitro-2-imidazolyl)-acrylolyl]-pyrrolidine.

When in the above procedure piperidine or morpholine is employed in place of pyrrolidine there is obtained 1-[3-(1-methyl-5-nitro-2-imidazolyl)-acryloyl] - piperidine and 1-[3-(1-methyl - 5 - nitro - 2 - imidazolyl)-acryloyl]-morpholine, respectively.

EXAMPLE 8

3-[1-(2-hydroxyethyl)-5-nitro-2-imidazolyl]acrylic acid 1-(2-hydroxyethyl) - 5 - nitroimidazole-2-carboxaldehyde (9.25 g.; .05 mole) is acetylated by warming it for 30 minutes at 80° C. in a mixture of 20 ml. of acetic anhydride and 20 ml. of pyridine. The reaction mixture is poured over a slurry of ice water and the product is collected by filtration, washed with water, and air-dried. The product may be purified by recrystallization from ethyl aectate, or may be used directly in the next reaction.

1-(2-acetoxyethyl) - 5 - nitroimidazole - 2 - carboxaldehyde (5.68 g.; .025 mole); malonic acid (2.7 g.; .025 m.); and pyridine (2 ml.) are combined and heated on a steam-bath for 30 minutes. The reaction mixture is cooled and triturated with 10 cc. of 2.5 N hydrochloric acid. The resulting crystalline product, 1-(2-acetoxyethyl)-5-nitroimidazole-2-acrylic acid, is collected by filtration, washed thoroughly with water, air-dried, and finally purified by recrystallization from ethyl acetate.

The above compounds (2.7 g.; .01 mole) is dissolved in a mixture of 20 cc. of methanol and 10 cc. of 10% potassium carbonate solution. The mixture is heated under reflux for one hour and cooled, diluted, with 100 cc. of water, and adjusted to pH 3 with concentrated hydrochloric acid. The precipitated product, 1 - (2-hydroxyethyl)-5-nitroimidazole-2-acrylic acid, is collected by filtration, washed with water, and air-dried. It is purified by recrystallization from aqueous ethanol (1/1).

EXAMPLE 9

3-[1-(2-hydroxyethyl)-5-nitro-2-imidazolyl)]acrylamide

3-[1-(1-acetoxyethyl)-5 - nitro - 2 - imidazolyl]acrylic acid (5.4 g.; .02 mole) is dissolved in 50 cc. of oxalyl chloride. The solution is refluxed for 30 minutes and the reagent is removed by distillation in vacuo. The residual 3-[1-(2-hydroxyethyl)-5-nitro - 2 - imidazolyl]-acryloly chloride is dissolved in 100 cc. of dry benzene. The mixture is filtered and dry ammonia gas is bubbled slowly through the solution for ca. 30 minutes. A mixture of 3-[1-(2-hydroxyethyl)-5-nitro-2-imidazolyl]-acrylamide and ammonium chloride precipitates and is collected by filtration, dried, and dissolved in 200 ml. of methanol. A solution of 5 g. of sodium carbonate in 50 ml. of water is added, and the alkaline solution is allowed to stand for three hours at room temperature. Most of the methanol is removed by careful distillation in vacuo at 40–41° C.

The aqueous residue is then extracted with 200 ml. of ethyl acetate. The extract is washed once with water and concentrated to afford a residue of 3-[1-(2-hydroxyethyl)-5-nitro-2-imadazolyl]-acrylamide, which may be purified by recrystallization from methanol.

EXAMPLE 10

N-cyclohexyl-3-[1-(2-hydroxyethyl)-5-nitro-2-imidazolyl]-acrylamide

3-[1-2-acetoxyethyl) - 5-nitro - 2 - imidazolyl]-acrylic acid (6.7 g.; .025 mole) is treated for 30 minutes with 75 cc. of refluxing oxalyl chloride. The excess oxalyl chloride is recovered by distillation in vacuo, and traces are removed by flushing the residual acid chloride twice with 20 cc. portions of benzene. Benzene (50 cc.) is added to the residue of the 3-[1-(2-acetoxyethyl)-5-nitro-2-imadazolyl] - acryloylchloride, the sodium is filtered, and added dropwise, with ice-bath cooling and stirring to a solution of 5.46 g. (.055 mole) of cyclohexylamine in 50 cc. of benzene. When the addition is complete, the mixture is stirred at room temperature for one hour and 200 ml. of ethyl acetate and 100 ml. of water are added. The organic layer is washed with 25 ml. of water and concentrated to a residue of N-cyclohexyl-3-[1-(2-acetoxy-ethyl)-5-nitro-2-imidazolyl]-acrylamide, which is subsequently purified by recrystallization from 50% aqueous ethanol.

The above compound is dissolved in a mixture of 20 cc. of methanol and 10 cc. of 10% potassium carbonate solution. The mixture is heated under reflux for 1 hour, cooled and diluted with 100 cc. of water. N-cyclohexyl-3-[1-(2 - hydroxyethyl)-5-nitro-2-imidazolyl]-acrylamide precipitates, is collected by filtration washed with water, and air dried. It is purified by recrystallization from ethanol.

When in the above procedure 2-butylamine, isopropylamine, 2-aminopyridine, n-butylamine, aniline or N-methylaniline is employed in place of cyclohexylamine there is obtained N-(2-butyl)-3-[1-(2-hydroxyethyl)-5-nitro-2-imidazolyl]-acrylamide,
N-isopropyl-3-[1-(2-hydroxyethyl)-5-nitro-2-imidazolyl]-acrylamide,
N-(2-pyroidyl)-3-[1-(2-hydroxyethyl-5-nitro-2-imidazolyl]-acrylamide,
N-(n-butyl)-3-[1-(2-hydroxyethyl-5-nitro-2-imidazolyl]-acrylamide,
N-phenyl-3-[1-(2-hydroxyethyl)-5-nitro-2-imidazolyl]-acrylamide,
N-methyl-N-phenyl-3-[1-(2-hydroxyethyl)-5-nitro-2-imidazolyl]-acrylamide,
respectively

What is claimed is:
1. A compound having the formula:

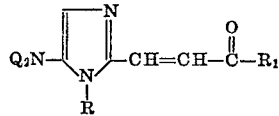

wherein R is lower alkyl or hydroxylower alkyl; and $R_1$ is hydroxy, loweralkoxy, chloro or $-NR_3R_4$ where $R_3$ and $R_4$ are each hydrogen, cyclohexyl loweralkyl, phenyl, fluorophenyl and thiazolyl; and $R_3$ and $R_4$ can be taken together forming a heterocyclic amine selected from the group consisting of pyrrolidino, piperidino, and morpholino.

2. A compound as defined in claim 1 in which $R_1$ is amino, mon substituted amino or disubstituted amino and said substitutions are loweralkyl, phenyl, or fluorophenyl.

3. A compound as defined in claim 2 in which $R_1$ is amino.

4. A compound as defined in claim 3 in which $R_1$ is loweralkylamino.

5. A compound as defined in claim 3 which is 3-(1-methyl-5-nitro-2-imidazolyl)acrylamide.

References Cited
UNITED STATES PATENTS
3,278,374  10/1966  Sims et al. _____ 260—309

HENRY R. JILES, Primary Examiner
H. I. MOATZ, Assistant Examiner

U.S. Cl. X.R.
260—240 A; 424— 248, 267, 273